(12) United States Patent
Deforet et al.

(10) Patent No.: US 9,527,599 B2
(45) Date of Patent: Dec. 27, 2016

(54) AIRCRAFT ENGINE FASTENER

(71) Applicant: Airbus Operations (S.A.S.), Toulouse (FR)

(72) Inventors: Thomas Deforet, Toulouse (FR); Arnold Wysocki, Mondonville (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 150 days.

(21) Appl. No.: 14/600,921

(22) Filed: Jan. 20, 2015

(65) Prior Publication Data
US 2015/0203208 A1 Jul. 23, 2015

(30) Foreign Application Priority Data
Jan. 21, 2014 (FR) .................................... 14 50467

(51) Int. Cl.
*B64D 27/26* (2006.01)

(52) U.S. Cl.
CPC ......... *B64D 27/26* (2013.01); *B64D 2027/266* (2013.01); *B64D 2027/268* (2013.01)

(58) Field of Classification Search
CPC .............. B64D 27/26; B64D 2027/262; B64D 2027/266; B64D 2027/268
See application file for complete search history.

(56) References Cited

U.S. PATENT DOCUMENTS

| 4,943,013 | A  | * | 7/1990  | Kapala ................... | B64D 27/26 |
|-----------|----|---|---------|---------------------------|------------|
|           |    |   |         |                           | 244/54     |
| 6,843,449 | B1 |   | 1/2005  | Manteiga et al.           |            |
| 8,561,941 | B2 | * | 10/2013 | Combes ................    | B64D 27/26 |
|           |    |   |         |                           | 244/54     |
| 2015/0167726 | A1 | * | 6/2015  | Cassagne ................ | F16B 39/24 |
|           |    |   |         |                           | 411/136    |
| 2015/0336678 | A1 | * | 11/2015 | Cassagne ............... | B64D 27/26 |
|           |    |   |         |                           | 244/54     |

FOREIGN PATENT DOCUMENTS

| EP | 1281615 A1 | 2/2003 |            |
|----|------------|--------|------------|
| FR | 2900906 A1 | 11/2007|            |
| FR | 3014972 A1 * | 6/2015 | ............. F16B 39/24 |

OTHER PUBLICATIONS

French Search Report for Application No. 1450467 dated Oct. 7, 2014.

* cited by examiner

*Primary Examiner* — Philip J Bonzell
(74) *Attorney, Agent, or Firm* — Jenkins, Wilson, Taylor & Hunt, P.A.

(57) ABSTRACT

An engine fastener includes a fixing assembly having a connection element provided with a shaft and holding two pins, which are configured to participate in the implementation of a fail-safe function, the fixing assembly including a shear pin surrounding the shaft of the connection element with a clearance, the shear pin being arranged between the two pins and being adjusted so as to be in contact with two joined fitting parts at a junction zone therebetween, the shaft of the connection element also being mounted with clearances relative to the two pins and the two fitting parts.

4 Claims, 4 Drawing Sheets

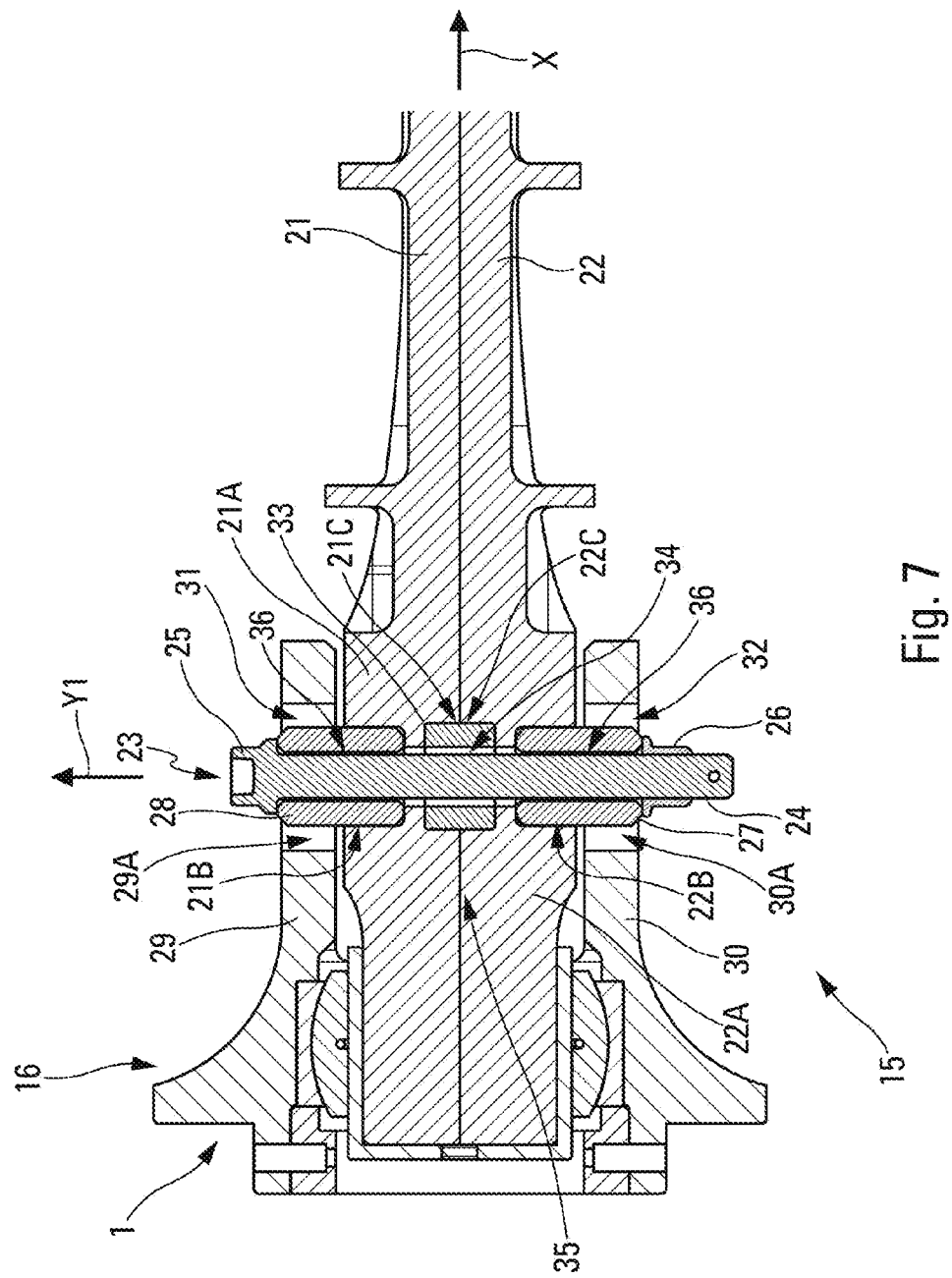

AIRCRAFT ENGINE FASTENER

CROSS-REFERENCE TO RELATED APPLICATION

This application claims priority to French Patent Application No. 14 50467 filed on Jan. 21, 2014, the entire content of which is incorporated by reference herein.

DESCRIPTION

Technical Field

The present disclosure relates to an engine fastener for an aircraft, and to an engine assembly comprising an engine and a nacelle stub for suspension of the engine, provided with a fastener system comprising such an engine fastener.

Background

An aircraft nacelle stub is usually provided to form the connection interface between an engine, such as a turbojet engine in particular, and a structural part, generally the wing, of the aircraft. The nacelle stub makes it possible to transmit to the structure of the aircraft the forces generated by the associated engine and also allows the routing of fuel and of air, as well as of electrical and hydraulic systems, between the engine and the aircraft.

In addition, the nacelle stub is provided in particular:
with a fastener system arranged between the engine and a rigid structure of the nacelle stub. This fastener system comprises at least two engine fasteners, generally at least front engine fastener and at least one rear engine fastener, of which the arrangement and the design are set and certified in order to effectively take up the forces and torques likely to be created along the three axes of the aircraft; and
with a mounting system arranged between the rigid structure of the nacelle stub and a structural part of the aircraft, such as the wing thereof.

It is known that the safety requirements concerning engine fasteners require the provision of "fail-safe" functions, which are provided in order to ensure a path of secondary forces in case of failure occurring at a given engine fastener.

SUMMARY

The present disclosure applies to a front engine fastener usually comprising an elongate fastener body formed of two fittings in contact and provided at a front end with a fixing assembly, so as to ensure a take-up of forces exerted in the above-mentioned transverse and vertical directions, and two connecting rods connected to the elongate fastener body at a rear end in order to ensure a take-up of forces exerted in transverse and longitudinal directions. In addition, the fixing assembly comprises a connection element provided with a shaft and arranged at the front end on a fitting part of each of the two fittings, the connection element holding two tubular pins mounted on the shaft.

A clearance is provided between each of the pins and a fixing lug formed in one piece with a cowl of the engine in order to avoid any contact in a configuration of normal operation. Due to this clearance, the two pins do not transfer any force in a configuration of normal operation. By contrast, in a configuration of failure, when one of the connecting rods for taking up thrust forces is broken, the axial thrust is transferred from the engine to the nacelle stub by the fixing lugs and these pins.

These elements are thus configured to implement a "fail-safe" function.

The connection element that clamps and adjusts these two pins passes through a bore formed in the two fitting parts and is in contact with these fitting parts, in the axial part between the two pins, at the junction between the two fitting parts. This connection element is then submitted to shear stress, generated by the two fitting parts, moreover both in a normal configuration and in a configuration of failure.

An object of the present disclosure is to overcome this disadvantage. The subject matter disclosed herein relates to an engine fastener making it possible in particular to prevent a connection element, which makes it possible to hold pins suitable for implementing a fail-safe function, from being subjected to shear stress and to a passage of force.

The subject matter disclosed herein relates to an aircraft engine fastener, intended to fix an engine to a nacelle stub for suspension of this engine, the engine fastener comprising an elongate fastener body formed of two joined fittings, the fastener body being provided at a first end with a fixing assembly, the engine fastener comprising two connecting rods connected by a crossbar to the elongate fastener body at a second end thereof opposite the first end, the fixing assembly comprising a connection element provided with a shaft and configured to hold two pins arranged one in each of the two fittings of the two fitting parts, the two fitting parts being joined at a junction zone, and the two tubular pins surrounding the shaft by being arranged one at each axial end of the shaft. The two pins are configured to participate in the implementation of a fail-safe function in a configuration of failure, in which one of the connection rods is broken.

In accordance with the subject matter disclosed herein, the fixing assembly comprises a tubular shear pin surrounding the shaft of the connection element with a clearance, the shear pin being arranged between the two pins and being in contact with the two fitting parts on either side of the junction zone, the shaft of the connection element also being mounted with clearances relative to the two pins and to the two fitting parts.

Thus, thanks to the subject matter disclosed herein, the shear pin in contact with the two fitting parts at the contact zone is subjected to the shear loads between the two fitting parts and thus protects the shaft of the connection element, relative to which it has a clearance, against such shear loads. Also, due to the different clearances provided, any passage of force at the connection element is thus eliminated.

In a preferred embodiment, the two fitting parts each comprise an individual tubular cutout, radially outside a cutout formed for the passage of the shaft of the connection element, these two individual tubular cutouts being adjacent at the junction zone and forming a tubular cutout configured to receive the shear pin with contact.

The present disclosure also relates to an engine assembly comprising an engine and a nacelle stub for suspension (or fastening) of this engine, the nacelle stub being provided with a fastener system comprising at least one front engine fastener and one rear engine fastener. In accordance with the subject matter disclosed herein, the front engine fastener is an engine fastener as mentioned above.

The present disclosure also relates to an aircraft, in particular a transport plane, which is provided with an engine assembly of this type.

BRIEF DESCRIPTION OF THE DRAWINGS

The figures will clarify how the subject matter disclosed herein can be realized. In these figures, identical references denote similar elements.

FIG. 7 is a sectional view along the line B-B of FIG. 4.

DETAILED DESCRIPTION

Figure 1:
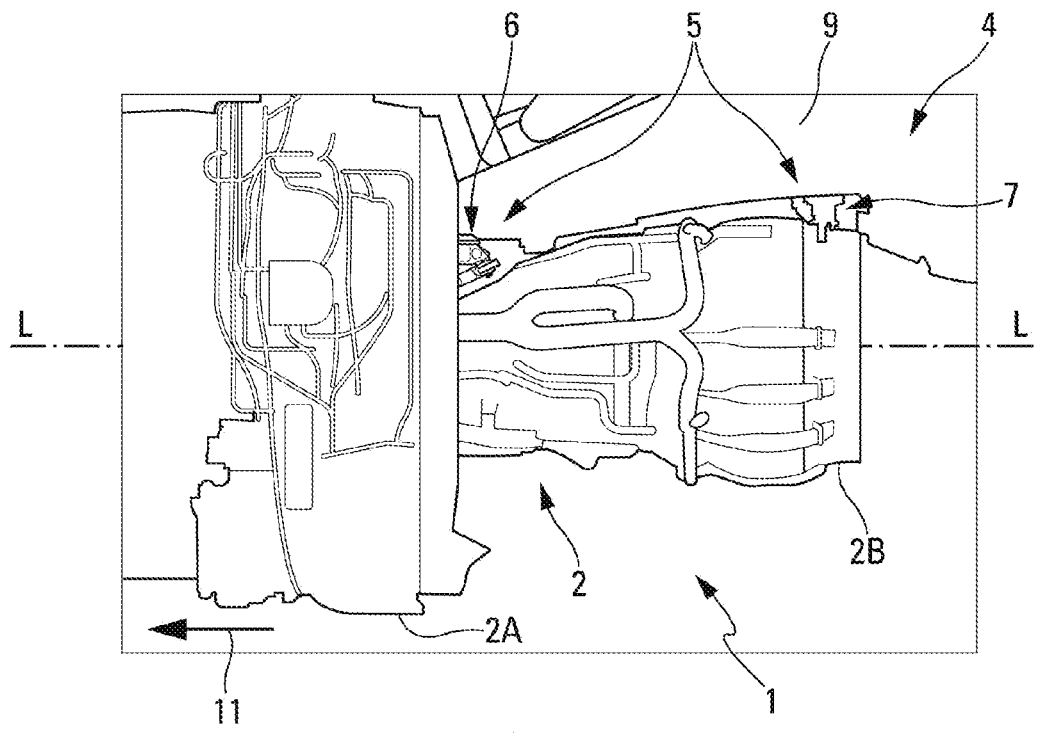
FIG. 1 is a lateral schematic view of part of a zone for fastening an engine to an aircraft nacelle stub.

The engine assembly 1 for an aircraft (not shown), making it possible to illustrate the subject matter disclosed herein and shown in FIG. 1, comprises an engine 2, such as a turbojet engine, and a nacelle stub 4. In the example of FIG. 1, in particular a fan casing 2A and a central casing 2B of the engine 2 are shown. In addition, the nacelle stub 4 is equipped with a fastener system 5 provided with a front engine fastener 6 and a rear engine fastener 7, as well as a rigid structure 9 carrying these engine fasteners 6 and 7.

Figure 2:
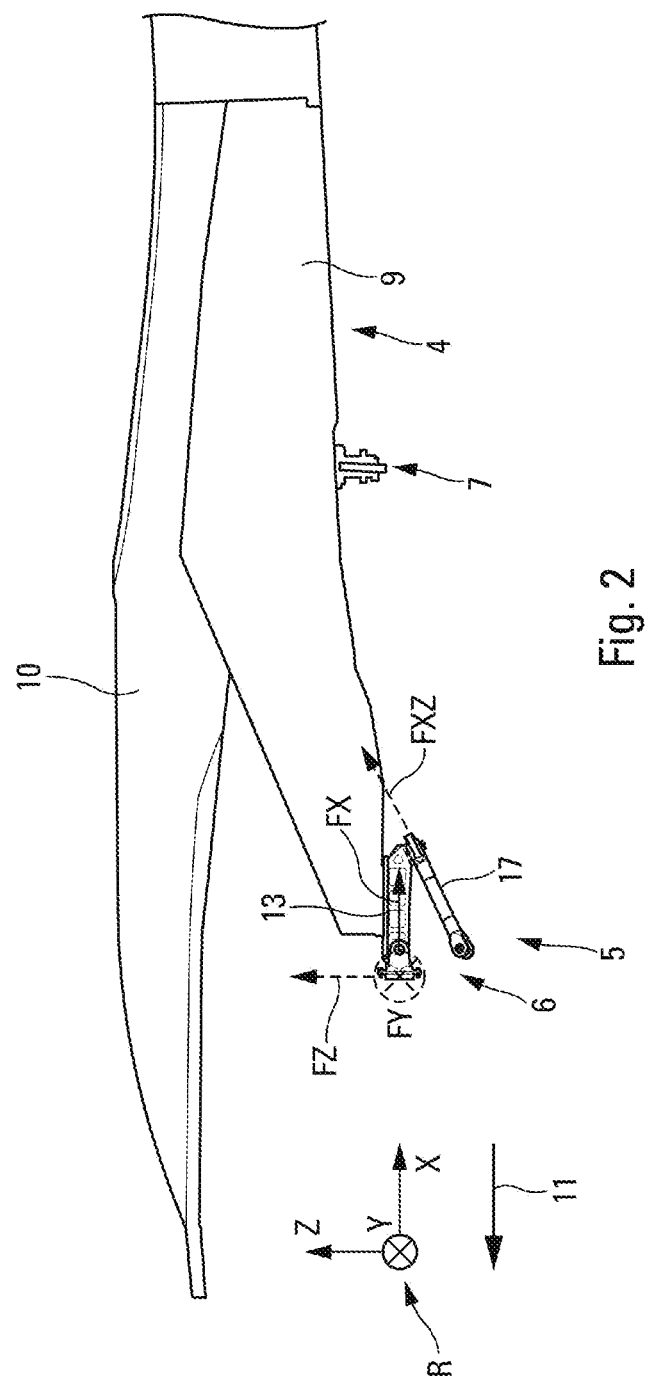
FIG. 2 is a lateral schematic view of a nacelle stub provided with a fastener system.

The nacelle stub 4 also comprises another series of conventional fasteners (or fixing structure) (not shown), making it possible to ensure the fixing of the engine assembly 1 on a structural element of the aircraft, generally on a wing 10 of the aircraft, as shown schematically in FIG. 2.

The rigid structure 9 of the nacelle stub 4 is formed structurally by spars, plates, ribs, etc. assembled together by any suitable structure or device used usually in this field and forming a rigid elongate box-type structure. In addition, fairings (not shown) encase the nacelle stub 4 in order to ensure aerodynamic continuity between the wing 10 and the engine 2.

To facilitate comprehension, an orthonormal reference R (FIG. 2) having axes or directions X, Y and Z is applied to the engine assembly 1. It is considered that:
the direction X is a longitudinal direction, this direction X passing via the front fastener 6 and being parallel to a longitudinal axis L-L of the engine 2 (FIG. 1) and substantially parallel to a median longitudinal direction of the nacelle stub 4;
the direction Y is a transverse direction, oriented transversely relative to the nacelle stub 4, the direction Y being orthogonal to the direction X; and
the direction Z is a vertical direction, which is orthogonal to the directions X and Y Y.

Furthermore, the terms "front" and "rear" throughout the description are to be considered relative to a forward direction of travel of the aircraft encountered in the event of a thrust exerted by the engine 2, this direction being shown schematically by an arrow 11 in FIGS. 1 and 2.

In these FIGS. 1 and 2, only the fasteners 6 and 7 and the rigid structure 9 of the nacelle stub 4 have been shown. Other components not shown of the nacelle stub 4, such as structure for fixing the rigid structure 9 below the wing 10 of the aircraft, or a secondary structure ensuring the segregation and holding of systems whilst carrying aerodynamic fairings, are elements identical or similar to those encountered in the prior art and known to a person skilled in the art. Consequently, there will be no detailed description in this regard.

As shown in FIGS. 1 and 2, the fastener system 5 comprises, in particular, the front engine fastener 6 and the rear engine fastener 7. The rear engine fastener 7 is of the usual type known to a person skilled in the art and will not be described further. This rear engine fastener 7 makes it possible to ensure a take-up of forces exerted in the transverse direction Y and vertical direction Z.

Figure 3:
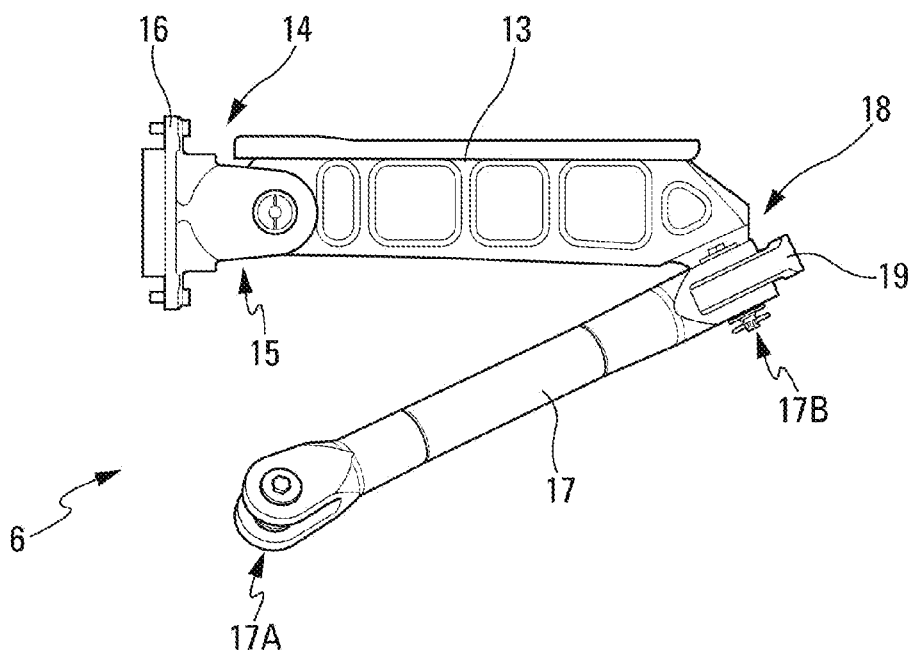
FIG. 3 is a lateral view of a front engine fastener of a fastener system.

The front engine fastener 6, as shown in FIG. 3, comprises an elongate fastener body 13, which is mounted in the direction X.

Figure 4:
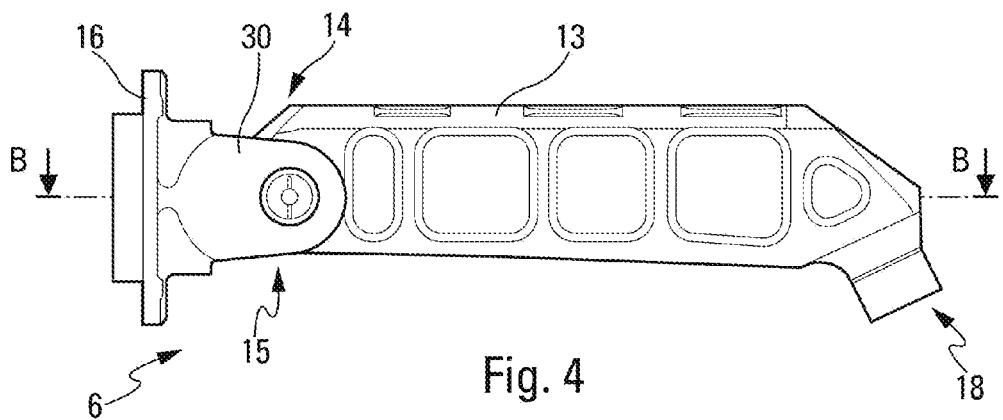
FIGS. 4 and 5 are, respectively, views from the side and from above of an elongate fastener body forming part of the front engine fastener of FIG. 3.
Figure 5:
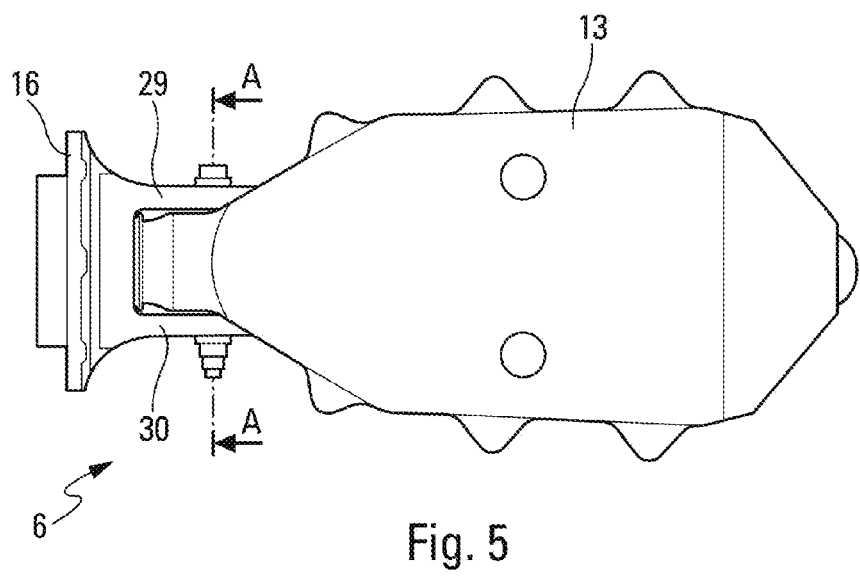

The fastener body 13 is fixed in the usual manner on the rigid structure 9 of the nacelle stub 4. This elongate fastener body 13, also shown in FIGS. 4 and 5 in views from the side and from below, is provided at a front end 14 with a fixing assembly 15 in order to establish a connection with the fan housing 2A of the engine 2 by a usual arrangement 16 fixed to the casing 2A. This connection makes it possible to ensure a take-up of forces exerted in the transverse direction Y and vertical direction Z, as illustrated by the arrows FY and FZ in the form of dashed lines in FIG. 2. The front engine fastener 6 additionally comprises two lateral connecting rods 17 connected to the fastener body 13 at a rear end 18, as shown in FIG. 3. The two connecting rods 17 are arranged symmetrically with respect to a vertical plane XZ, a single connecting rod 17 being visible in this FIG. 3 due to the lateral view. The two connecting rods 17 are each connected in an articulated fashion:
on the one hand by a front end 17A to a rear part of the fan casing 2A of the engine 2; and
on the other hand by a rear end 17B to a crossbar 19 mounted in an articulated fashion on the rear end 18 of the fastener body 13.

These connecting rods 17 make it possible to ensure a take-up of thrust forces exerted in the longitudinal direction X and vertical direction Z, as shown by an arrow FXZ in the form of dashed lines in FIG. 2.

In this way, during normal operation:
thrust forces generated by the engine 2 and exerted in the direction X are taken up with the aid of the two lateral connecting rods 17;
forces exerted in the direction Y are taken up jointly with the aid of the fixing assembly 15 for fastening the front fastener 6 and the rear fastener 7; and
forces exerted in the direction Z are taken up jointly with the aid of the front and rear fasteners 6 and 7.

In addition, the fastener body 13 of the front fastener 6, arranged along the axis X, is formed of two main fittings 21 and 22, as shown in FIG. 7. The two fittings 21 and 22, which are symmetrical with respect to the plane XZ, are arranged in a superposed manner, in contact with one another.

In addition, the fixing assembly 15 comprises a connection element 23 26 connecting two fitting parts 21A and 22A corresponding to the front ends of the fittings 21 and 22. This connection element 23 is arranged along an axis Y1 parallel to the axis Y and passes through bores formed in the two fitting parts 21A and 22A. This connection element 23, in the form of a bolt, comprises a shaft 24 provided at one end with a head 25 and able to receive at the other end a clamping nut 26.

In addition, two tubular pins 27 and 28 are mounted on the connection element 23. These pins 27 and 28 surround the shaft 24 and are arranged one at each axial end of the shaft 24 so as to penetrate the cutouts 21B and 22B formed in the fitting parts 21A and 22A and at the same time the bores 29A and 30A formed in the fixing lugs 29 and 30 of the arrangement 16 (integral with the fan housing 2A).

Each of the pins 27 and 28 is in contact with part of the outer surface of the corresponding fitting part 21A, 22A at the corresponding cutout 21B, 22B, but has a clearance 31, 32 relative to the corresponding fixing lug 29, 30.

The clearance 31, 32 is provided between each pin 27, 28 and the corresponding fixing lug 29, 30 in order to avoid any contact in a configuration of normal operation. The pins 27 and 28 thus do not transfer any force in a configuration of normal operation.

By contrast, in a configuration of failure when one of the connection rods 17 for taking up thrust forces (intended to transfer in particular the axial thrust) is broken, the axial thrust (along X) is transferred from the engine 2 to the nacelle stub 4 by the fixing lugs 29 and 30 and stop pins 27 and 28.

This particular arrangement consequently makes it possible to take up the thrust forces exerted in the direction X in the case of rupture of one of the two connecting rods 17, as illustrated by an arrow FX in the form of a solid line in FIG. 2. This makes it possible to ensure a function of the "fail-safe" type for the transmission of forces in the direction X. In addition, due to the clearances 31 and 32 between the pins 27 and 28 and the bores 29A and 30A, this path of forces is solely operational in the case of a rupture of a connecting rod 17.

Figure 6:
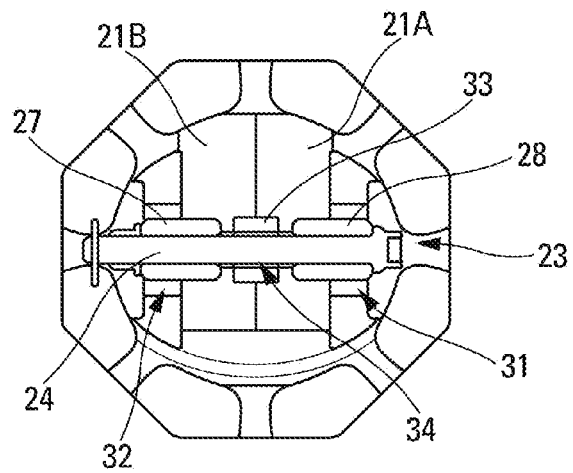
FIG. 6 is a sectional view along the line A-A of FIG. 5.

In addition, in accordance with the subject matter disclosed herein, a tubular shear pin 33 is also mounted on the shaft 24 of the connection element 23. This shear pin 33 surrounds the shaft 24 with a clearance 34, as shown in FIGS. 6 and 7. The shear pin 33 is arranged between the two pins 27 and 28 at the junction zone 35 between the two fitting parts 21A and 21B.

In addition, it is adjusted so as to be in contact with the two fitting parts 21A and 21B. To do this, the two fitting parts 21A and 21B each comprise an individual tubular cutout 21C, 22C, radially outside the bore formed for the passage of the shaft 24 of the connection element 23, at the junction zone 35 of the two joined fitting parts 21A and 21B. These two individual tubular cutouts 21C and 21D are adjacent so as to form a tubular cutout of inner shape and size complementary to the shape and size of the outer surface of the shear pin 33 so as to receive the shear pin 33 with contact.

Thus, the shear pin 33 transfers the shear loads between the two fitting parts 21A and 21B with which it is in contact.

By its arrangement in contact with the tubular cutouts 21C and 21D, radially as well as axially (in the direction Y1), the shear pin 33 is also involved in the connection of the two fitting parts 21A and 21B.

In addition, the clearance 34 is also provided between the fitting parts 21A and 21B and the shaft 24 of the connection element 23, axially (along Y1) on either side of the shear pin 33, that is to say between the shear pin 33 and the pin 27 and between the shear pin 33 and the pin 28. Thus, the shaft 24 is not in contact with the two fitting parts 21A and 21B.

In addition, clearances 36 are also provided between the connection element 23 and each of the pins 27 and 28. As there is then a clearance 34 between the shear pin 33 and the shaft 24 of the connection element 23, and also clearances 36 between the shaft 24 and the pins 27 and 28, the connection element 23 does not transfer any shear load. Consequently, the connection element 23, which clamps and adjusts the two pins 27 and 28 and the shear pin 33, never transfers any force.

The pins 27 and 28 and the connection element 23 withstand loads only in a configuration of failure.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. An aircraft engine fastener, intended to fix an engine to a nacelle stub for suspension of this engine, the engine fastener comprising an elongate fastener body formed of two joined fittings, the fastener body being provided at a first end with a fixing assembly, the engine fastener comprising two connecting rods connected by a crossbar to the fastener body at a second end thereof opposite the first end, the fixing assembly comprising a connection element provided with a shaft and configured to hold two tubular pins arranged one in each of the two fitting parts of the two fittings, the two fitting parts being joined at a junction zone, and the two tubular pins surrounding the shaft by being arranged one at each of the two axial ends of the shaft, the fixing assembly comprising a tubular shear pin surrounding the shaft of the connection element with a clearance, the shear pin being arranged between the two pins and being in contact with the two fitting parts on either side of the junction zone, the shaft of the connection element also being mounted with clearances relative to the two pins and to the two fitting parts.

2. The aircraft engine fastener according to claim 1, wherein the two fitting parts each comprise an individual tubular cutout, radially outside a bore formed for the passage of the shaft of the connection element, these two individual tubular cutouts being adjacent at the junction zone and forming a tubular cutout configured to receive the shear pin with contact.

3. An engine assembly comprising an engine and a nacelle stub for suspension of this engine, the nacelle stub being provided with a fastener system comprising at least one front engine fastener and one rear engine fastener, wherein the front engine fastener is an engine fastener according to claim 1.

4. An aircraft,
the aircraft comprising at least one engine assembly according to claim 3.

* * * * *